Nov. 27, 1923.
A. P. DIESCHER
EXPANSION JOINT
Filed Jan. 16, 1922
1,475,289
2 Sheets-Sheet 1
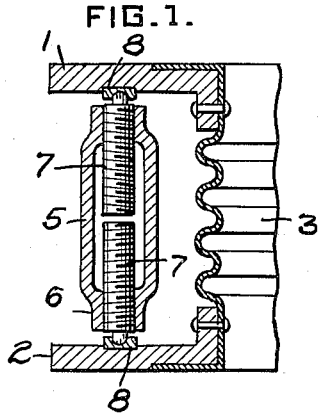
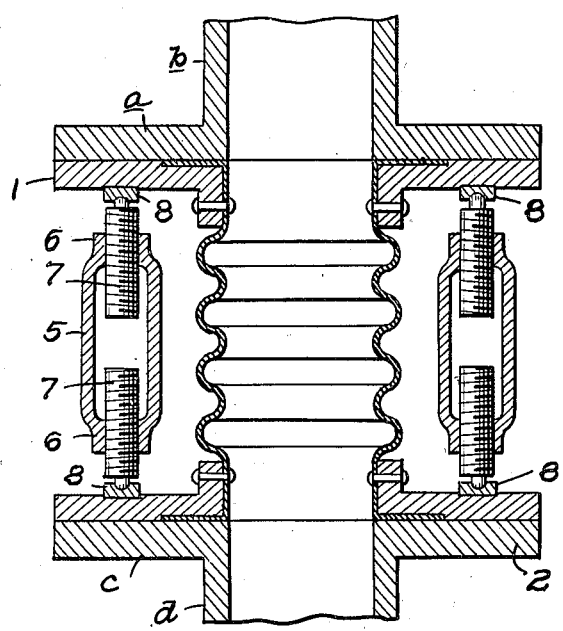
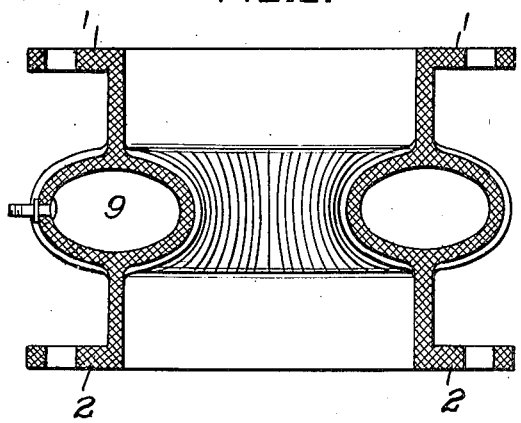
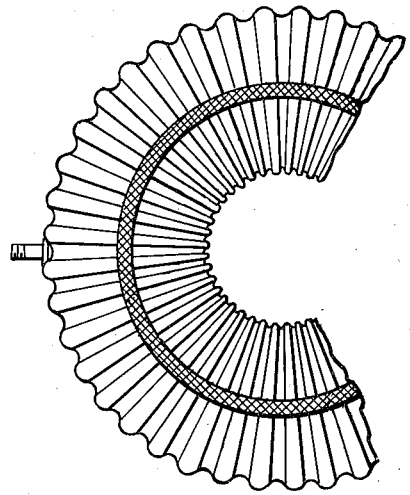
INVENTOR
August P. Diescher
WITNESSES Patented Nov. 27, 1923.

1,475,289

UNITED STATES PATENT OFFICE.

AUGUST P. DIESCHER, OF PITTSBURGH, PENNSYLVANIA, ASSIGNOR TO S. DIESCHER & SONS, A PARTNERSHIP CONSISTING OF SAMUEL E. DIESCHER AND AUGUST P. DIESCHER.

EXPANSION JOINT.

Application filed January 16, 1922. Serial No. 529,699.

*To all whom it may concern:*

Be it known that I, AUGUST P. DIESCHER, residing at Pittsburgh, in the county of Allegheny and State of Pennsylvania, a citizen of the United States, have invented or discovered certain new and useful Improvements in Expansion Joints, of which improvements the following is a specification.

In an application filed January 16, 1922, Serial No. 529698 I have described and shown an improvement in extensible joints whereby joints may be reduced in length permitting of their easy and quick substitution for injured joints.

The invention described herein has for its object the provision of a joint or coupling having annular end flanges and an annular wall connecting said flanges, said wall being extensible in directions substantially parallel with the axis of the joint, it being the purpose of the invention to make the joint shorter than the space into which it is to be inserted and to be extended when in place. The invention is hereinafter more fully described and claimed.

Figure 5:
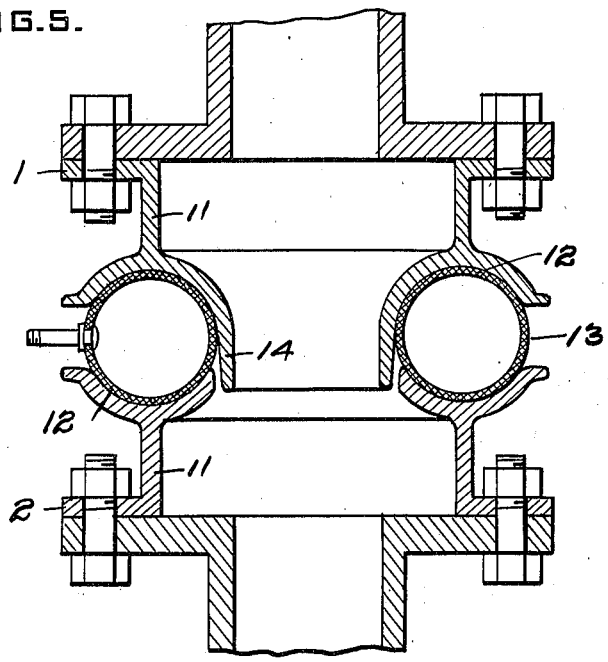
Figure 6:
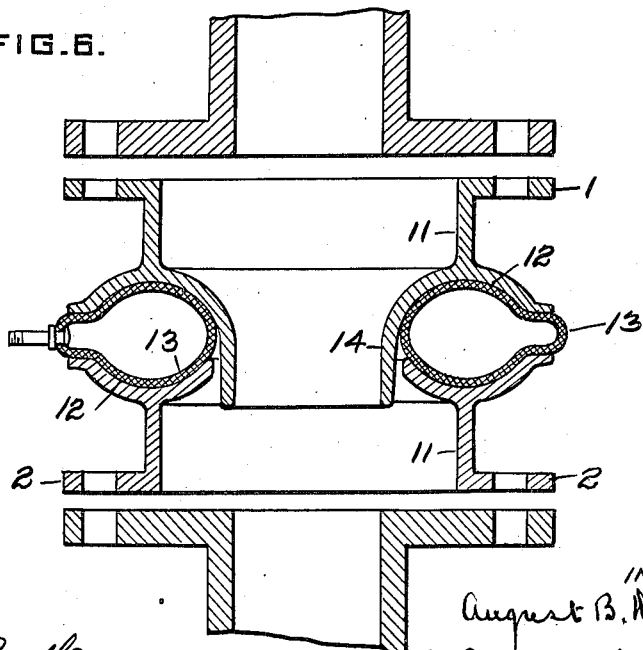

In the accompanying drawings forming a part of this specification, Fig. 1 is a sectional view of a non-extended joint and means for extending the joint; Fig. 2 is a similar view showing joint extended and screwed in position in the exhaust of an electric turbine; Fig. 3 is a sectional view showing a modification of the joint; Fig. 4 is a sectional plan of the joint shown in Fig. 3; Fig. 5 is a sectional view showing a further modification, the joint being extended; and Fig. 6 is a sectional view of the joint shown in Fig. 4, non-extended.

The form of joint or coupling shown in Figs. 1 and 2, is not greatly different from joints now in use, and consists of annular flanges 1 and 2, and a shell 3 having its ends secured to the respective flanges and circumferentially corrugated. In the practice of the invention claimed herein the body portion or shell 3 is made of such a length that the distance between the faces of the flanges is sufficiently less than the length of the space into which the joint is to be placed as to permit of the easy and quick insertion of the joint; as for example, if a joint is to be replaced in the connection between a steam turbine and a condenser, the new joint will be made of a length substantially less than the distance between the flange *a* on the exhaust nozzle 4 of the turbine and the flange *c* on the pipe *d* extending to the condenser. After the new joint or section has been placed between the flanges *a* and *c*, force is applied in such manner as to move the flanges 1 and 2 apart and into contact with the flanges *a* and *c* to which the flanges 1 and 2 are then bolted.

A convenient means for forcing the flanges apart which movement is permitted by the flexing of the corrugations, consists of a turn-buckle 5 having internally threaded heads or enlargements 6 at its ends, and threaded rods 7 engaging the threaded openings in the heads. While not necessary it is preferred that bearing plates 8 should be interposed between the outer ends of the threaded rods and the flanges 1 and 2.

In the construction shown in Fig. 3 the joint or coupling is made of rubber and the shell or body portion is formed with a chamber 9 having flexible walls. This chamber is preferably oval in contour and has its longer axis at an angle, preferably a right angle, to the axis of the joint. This joint is so proportioned that when the walls of the chamber are not subjected to a distorting pressure the distance between the outer faces of the flanges 1 and 2 will be shorter than the length of space in which the joint is to be fitted and can therefore be easily slid into such space. After the joint has been so placed, air or other fluid is forced into the chamber, thereby causing a separating movement of the longer sides of the chamber and consequently of the flanges, until the latter bear against the parts to which they are to be secured. It is preferred that the inner and outer walls of the annular chamber should be corrugated as shown in Fig. 4 to facilitate their movements when the chamber is inflated.

As shown in Figs. 5 and 6, the shell intermediate the flanges 1 and 2 may be made in sections and the sections forced apart to move the flanges against the parts to which they are to be secured by an expansible member interposed between the sections and adapted to form a part of the wall of the shell. A convenient construction of this type of joint or section consists of flanges 1 and 2 and wall sections 11 provided with concave seats 12 for the annular tube 13 formed of rubber or other suitable material. By the inflation of this tube which corresponds in position and function to the chamber 9 in the construction shown in Figs. 3 and 4, the sections of the joint will be forced outwardly to bring the flanges against the parts to which they are to be secured.

In the construction shown in Fig. 4 pressure need not be maintained in the chamber 9 after the flanges have been secured in operative positions, but in the construction shown in Figs. 5 and 6 sufficient pressure should be maintained in the annular tube 13 as to maintain tight joints between the seats 12 and the tube.

In order to prevent the sections 11 from being forced out of alinement, one of the seats 12 is provided with a collar 14 which will overlap the other seat. This collar should be made of such diameter relative to that of the seat which it overlaps as to permit of one section of the joint or section being moved to an angular position relative to the other section.

I claim herein as my invention:

1. The method herein described of inserting a joint or coupling having a longitudinally and laterally yielding side wall between relatively fixed members of a fluid conductor which consists in forming the joint or coupling of a length substantially less than the distance between such fixed members, passing such coupling between the fixed members and applying pressure to the side wall of the coupling in a direction to decrease the peripheral dimensions of a portion of the same side wall and thereby elongating the coupling and causing the ends thereof to move into contact with the fixed members of the fluid conductor.

2. A joint or coupling having a length less than the distance between the members of a fluid conductor to be connected, having in combination annular flanges, a shell intermediate said flanges, a portion of the wall of the shell being formed of a peripherally variable element and means for so changing the peripheral dimensions of such element as to increase the length of the coupling.

3. A joint or coupling having a length substantially less than the distance between the members to be connected, having in combination annular flanges, a shell intermediate said flanges, a portion of the wall of the shell being formed by an annular chamber having flexible walls and means for changing the tranverse dimensions of the shell to increase the distance between the flanges.

4. A joint or coupling having a length substantially less than the distance between the members to be connected having in combination annular flanges provided with seats and an element adapted to be expanded to increase the length of the joint or coupling interposed between the seats and a collar carried by one of the seats and overlapping the other seat.

5. A joint or coupling having a length less than the distance between the members to be connected, having in combination annular flanges provided with seats and an element adapted to be peripherally expanded to increase the length of the joint or coupling interposed between the seats.

6. A joint or coupling having a length less than the distance between the members of a fluid conductor to be connected, having in combination annular flanges, a shell intermediate said flanges, a portion of the wall of said shell being adapted to be peripherally expanded to increase the length of the coupling.

In testimony whereof I have hereunto set my hand.

AUGUST P. DIESCHER.